April 21, 1931. J. F. RULE ET AL 1,801,457
APPARATUS FOR GATHERING MOLTEN GLASS
Filed May 15, 1928 2 Sheets-Sheet 1
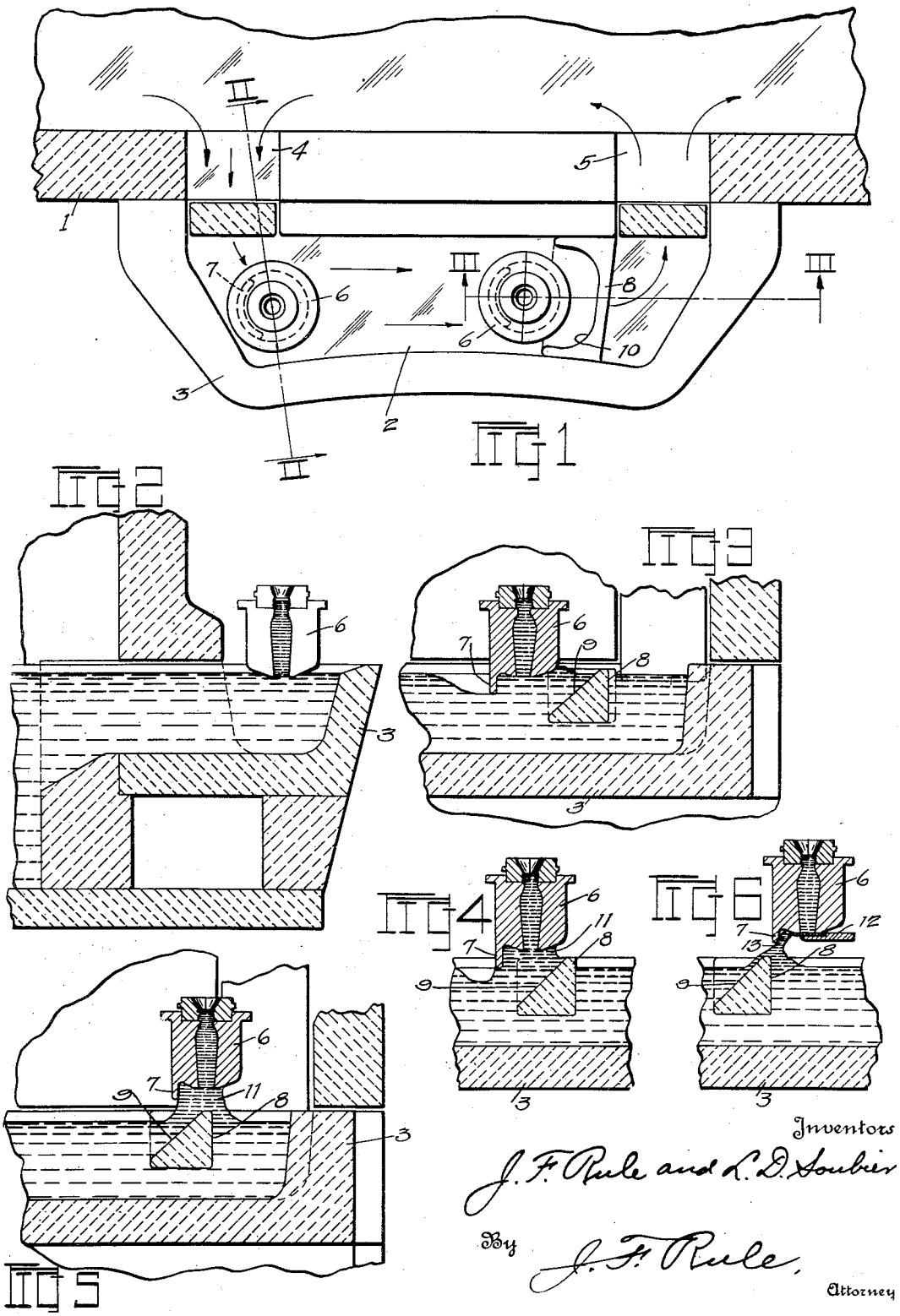

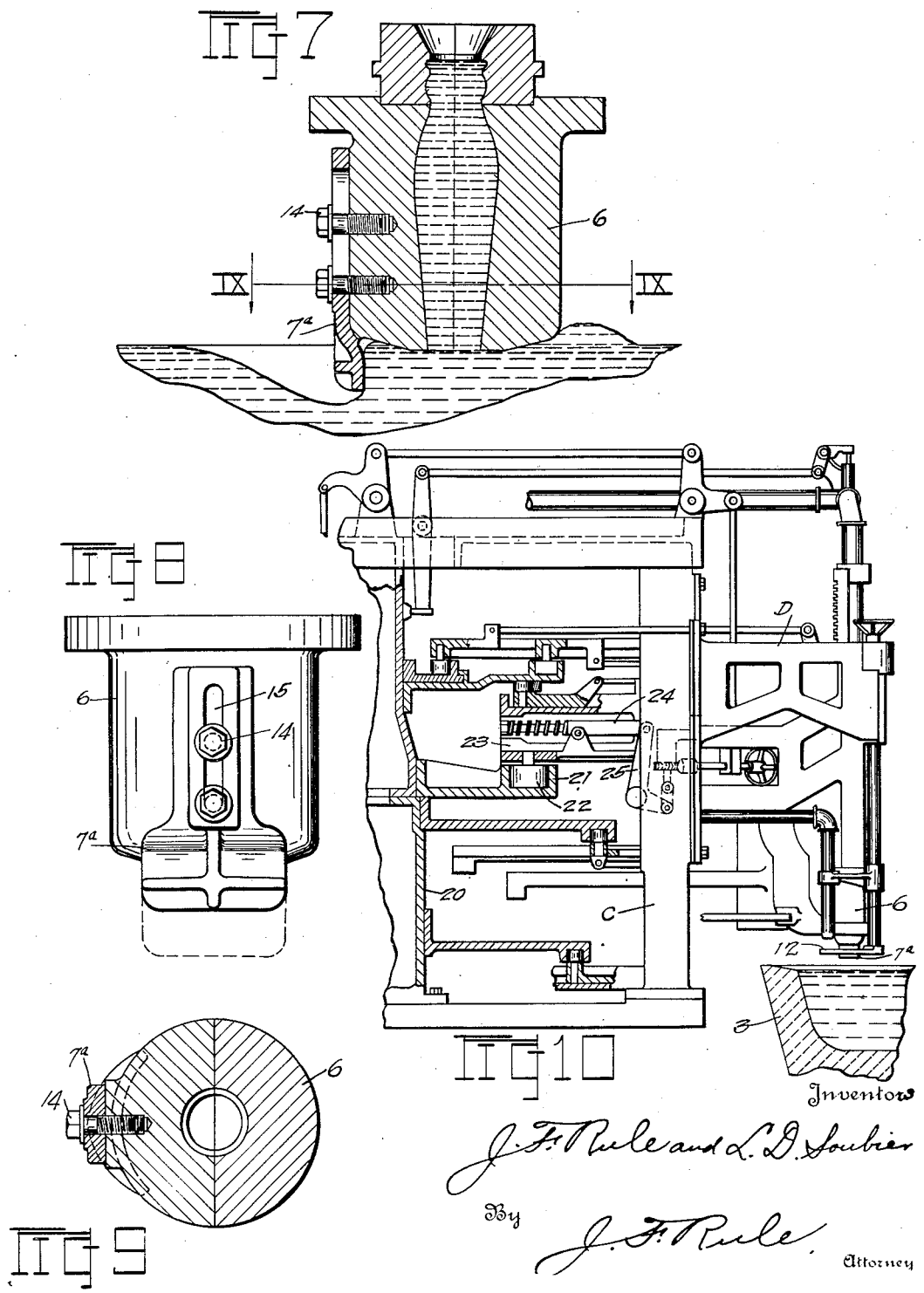

Patented Apr. 21, 1931

1,801,457

UNITED STATES PATENT OFFICE

JOHN F. RULE AND LEONARD D. SOUBIER, OF TOLEDO, OHIO, ASSIGNORS TO OWENS-ILLINOIS GLASS COMPANY, OF TOLEDO, OHIO, A CORPORATION OF OHIO

APPARATUS FOR GATHERING MOLTEN GLASS

Application filed May 15, 1928. Serial No. 277,872.

The present invention relates to the manufacture of glass articles and, more particularly, to the gathering of charges of molten glass by suction into molds.

At the present day, machines for forming hollow glass articles, of the type in which the glass is gathered by suction into the molds, commonly comprise a continuously rotating mold carriage and a series of molds thereon which are periodically brought into contact with a supply of molten glass from which the glass is drawn into the mold by suction. The lower open ends of the molds dip a short distance into the glass for the gathering operation and while gathering move forward with their lower ends just beneath the surface of the glass. As the mold carriage in a modern type machine rotates rather rapidly, the molds are caused to travel through the glass at a rather high speed and this produces more or less of a trough or wake behind the mold. It is found that this trough sometimes prevents the glass in the supply pool from making a perfect seal with the bottom of the mold so that when suction is applied for drawing glass into the mold, more or less air is drawn in with the glass, preventing the mold from being completely filled. This results in an imperfect parison.

An object of the present invention is to provide means for overcoming this difficulty. For this purpose, there is provided behind the mold, suitable means projecting downward into the glass below the mold for maintaining a full supply of glass at the charge opening in the bottom of the mold. Such means also serves to carry along with the mold, a supply of glass from which the mold charge is drawn so that the mold is gathering its charge from glass which is advancing therewith, instead of the mold and the surface of glass from which the mold charge is being drawn, having a rapid relative movement horizontally.

With a machine of the type above indicated, in which the molds are brought in rapid succession to charge gathering position, it is necessary to maintain a circulation of the supply body of glass in order to carry away the surface portions which have been chilled by contact with the molds. For this purpose, it is customary to employ a continuously rotating pot containing a supply of molten glass into which the molds dip to gather. An object of the present invention is to provide in connection with the molds, suitable means for circulating the glass in a manner to render unnecessary the employment of a rotating gathering pot.

Other objects of the invention will appear hereinafter.

In the accompanying drawings:

Fig. 1 is a fragmentary sectional plan view showing a portion of a furnace tank, a forehearth or channel through which glass from the tank circulates past a gathering area, and molds in position for gathering charges of glass.

Fig. 2 is a sectional elevation at the line II—II on Fig. 1 and shows a mold in dip.

Fig. 3 is a sectional elevation at the line III—III on Fig. 1, and shows a mold still in dip but advanced to a point adjacent a wall or dam over which the mold is lifted prior to the operation of the knife for severing the tail of glass which depends from the mold when the latter is lifted from the supply pool.

Figs. 4, 5 and 6 are sectional views showing progressive steps in the movement of the mold over said dam.

Fig. 7 is a view on a larger scale, showing a mold in gathering position and illustrating an adjustable paddle attached to the mold.

Fig. 8 is an elevation view of the mold and paddle looking in a direction at right angles to that of Fig. 7.

Fig. 9 is a sectional plan view at the line IX—IX on Fig. 7, as viewed in an upward direction.

Fig. 10 is a side elevation of a portion of the forming machine.

Referring to the drawings, a furnace tank 1 which may be of usual construction, provides a continuous supply of molten glass which circulates through a channel 2 formed in a forehearth or tank extension 3. The glass enters said channel through a passageway 4, moves through the channel 2 and is returned to the tank through a passageway 5, said passageways extending through the front wall of the furnace.

Molds 6 carried on a continuously rotating mold carriage C (Fig. 10) are brought in succession to a charge gathering position over the glass in the channel 2. Each mold as it is brought over the channel is lowered so that the lower end of the mold contacts with the glass and makes a seal therewith permitting a charge of glass to be drawn by suction into the mold in a well known manner.

The molds travel through the glass at a rather high speed, thereby forming a wake or trough which marks the path of the mold through the glass. There is thus a tendency for the glass to draw away from the mouth of the mold, preventing a perfect seal and permitting more or less air to be drawn into the mold when suction is applied. This prevents the mold from being properly filled with glass and results in imperfect ware.

In accordance with the present invention, this difficulty is overcome by providing means behind the mold to dip into the glass to a greater depth than the mold and thus cause a certain amount of the glass in the channel to be carried along with the mold so that a perfect seal is maintained and the mold properly filled when suction is applied. Such means, as shown in Figs. 1 to 6 inclusive, comprises a shield or paddle 7 which, as shown, is formed as an integral extension of the mold. This extension, as indicated in Fig. 1, is curved to conform to the outline on the mold and thus provides a pocket beneath the mold. As the mold advances, the glass in this pocket is carried forward with the mold so that there is little or no relative movement in the direction of mold travel, of the mold itself and the glass at the fill opening of the mold. The charge of glass is therefore drawn into the mold from a supply body which is advancing with the mold, or in other words is substantially stationary relative to the mold. The shield 7 also prevents said mold opening from being exposed to the air and allowing leakage of air into the mold during the filling operation.

The shield or paddle 7 further serves as a means to maintain a circulation of glass through the channel 2. This movement of the glass through the channel is assisted and rendered more positive by providing a wall or dam 8 which extends across the channel adjacent the discharge end thereof. The upper surface of this dam is near the normal level of the glass in the channel but may be either a short distance above or below said level. As herein shown, it projects upward a short distance above said level. The front face 9 of the dam 8 is preferably inclined and may be curved as indicated at 10 (Fig. 1) to present a concave surface. This provides a sort of pocket for the glass which is being carried forward with the mold and materially assists in causing a wave of glass to be thrown over the dam as the mold approaches and moves over the dam.

When the mold reaches a position adjacent the dam (Fig. 3) its direction of movement is changed from a horizontal to an upwardly inclined direction so that it will clear the dam and the channel wall. Fig. 4 shows the mold in close proximity to the dam and lifted to a higher level than during the gathering operation. It will be noted that a certain amount of glass is trapped between the projection 7 and the face 9 of the dam and is moving upward and forward with the mold so that as the mold passes over the dam (Fig. 5) a considerable quantity or wave 11 of glass is carried over the dam.

When the mold reaches the Fig. 6 position just beyond the dam, a knife 12 operates in the usual manner to shear across the bottom of the mold and sever the tail 13 of glass depending from the mold. This portion of glass 13 which has been chilled by contact with the mold is thus dropped back into the supply body at a point beyond the dam. The projection 7 aids in advancing this chilled portion and preventing it from being drawn back into the glass that has not passed over the dam.

From the above description, it will be seen that the dam materially assists in maintaining a circulation of glass past the gathering area and in preventing portions of the glass which have been chilled by contact with the mold and cut-off knife from dropping back or accumulating where they might be drawn into succeeding molds. The glass that is carried beyond the dam moves forward into the furnace tank 1 and is completely remelted and assimilated before it is again brought into position to reenter the channel 2.

It is to be noted that the present invention provides means by which an effective circulation of glass past a gathering area is maintained in a construction employing a stationary container from which the glass is gathered, whereas it has heretofore been the usual practice to employ a continuously revolving gathering pot or tank in order to carry the chilled portions of glass away from the gathering area.

Referring to Figs. 7, 8 and 9, a modified form of paddle or shield 7ª is illustrated. As here shown, the shield is made as a separate piece adjustably attached to the mold by means of screw bolts 14 which extend through a vertical slot 15 in the stem of the paddle and are threaded into the mold. By loosening the bolts 14, the paddle may be adjusted vertically to any desired position.

This construction also permits the paddle to be quickly removed and replaced by a new paddle of the same or a different form, as may be desired, and also permits the mold to be used without this attachment, where circumstances make it desirable.

Fig. 10 illustrates a type of glass forming machine with which the present invention may be used. For a full disclosure of the construction and operation of this machine, reference may be had to the patent to La France, Number 1,185,687, June 6, 1916. This machine comprises a series of heads or units each including a dipping frame D mounted for up and down movement on the carriage C which is rotated continuously about a central stationary column 20. The dipping frame D carries the mold 6 and associated mechanism and is moved up and down by means of a stationary cam 21 on which runs a cam roll 22 carried by a slide block 23 having an operating connection through a link 24 and bell crank lever 25 with the dipping frame D. The cam 21 is so shaped that as the mold passes over the end wall of the channel 2, it is lowered to the Fig. 2 position in which the mouth of the mold is in contact with and slightly below the level of the glass in the channel. From this point, the mold moves forward horizontally until it reaches the Fig. 3 position, and then moves in an upwardly inclined direction until elevated sufficiently to pass over the dam 8 and the end wall of the channel.

Various modifications may be resorted to within the spirit and scope of the invention.

What we claim is:

1. In glass forming apparatus, the combination of a suction gathering mold, means for causing it to travel in contact with a supply body of molten glass to permit a charge of glass to be introduced by suction into the mold, and means traveling with the mold and operating on the supply body of glass to maintain the glass in sealing contact with the mouth of the mold.

2. In glass forming apparatus, the combination of a suction gathering mold, means for causing it to travel in contact with a supply body of molten glass to permit a charge of glass to be introduced by suction into the mold, and mechanical means extending into the glass behind the mold and traveling with the mold for maintaining the glass in sealing contact with the mouth of the mold.

3. In glass forming apparatus, the combination of a suction gathering mold, means for causing it to travel in contact with a supply body of molten glass to permit a charge of glass to be introduced by suction into the mold, and a paddle traveling with the mold and projecting downward into the glass behind and in close proximity to the mold to maintain the glass in sealing contact with the mouth of the mold.

4. In glass forming apparatus, the combination of a suction gathering mold, means for causing it to travel in contact with a supply body of molten glass to permit a charge of glass to be introduced by suction into the mold, and a paddle traveling with the mold and projecting downward into the glass behind and in close proximity to the mold to maintain the glass in sealing contact with the mouth of the mold, said paddle having its front face concave to provide a pocket in which a supply of glass is held so as to advance with the mold.

5. In glass forming apparatus, the combination of a suction gathering mold, means for causing it to travel in contact with a supply body of molten glass to permit a charge of glass to be introduced by suction into the mold, and a paddle traveling with the mold and projecting downward into the glass behind and in close proximity to the mold to maintain the glass in sealing contact with the mouth of the mold, said paddle being adjustable up and down relative to the mold.

6. In a glass forming machine, the combination of a mold for gathering glass by suction, and an implement attached to the mold in position to project downwardly below the bottom of the mold behind the mold cavity.

7. In a glass forming machine, the combination of a mold for gathering glass by suction, an implement attached to the mold in position to project downwardly below the bottom of the mold behind the mold cavity, said implement comprising a vertically slotted stem, and bolts extending through said slot and adjustably securing the implement to the mold.

8. The method of introducing a charge of molten glass into a mold, which comprises causing the mold to traverse a supply body of molten glass with the mouth of the mold in sealing engagement with the glass, producing in said supply body a zone of glass immediately below and in contact with the mold and of substantially greater lateral extent than the mouth of the mold, causing said zone of glass to advance with the mold, and drawing glass from the interior of the zone into the mold while said zone of glass is advancing with the mold through the surrounding portion of the supply body.

9. The method which comprises defining in a supply body of molten glass an integral zone of glass, causing said zone of glass to advance through the surrounding body of glass, causing a mold to advance with said zone with the mouth of the mold in sealing contact with the glass in said zone, and causing glass from the interior of said zone to enter the mold while the latter is advancing with said zone.

10. The combination with a glass tank, of a channel having its ends in communication with the interior of the tank to permit circulation of glass from the tank into the channel and back into the tank, a wall or dam extending across the channel at a position outside of the tank and intermediate the ends of the channel, a suction gathering mold, means to cause said mold to traverse the glass in the channel, gather a charge of glass by suction and pass over said dam, and a paddle carried with the mold and projecting downward behind the mold into the supply body of glass and operable to drive a wave of glass over the dam.

Signed at Toledo, in the county of Lucas and State of Ohio, this 11th day of May, 1928.

JOHN F. RULE.
LEONARD D. SOUBIER.